United States Patent [19]

Natarajan

[11] Patent Number: 5,742,610
[45] Date of Patent: Apr. 21, 1998

[54] METHOD AND APPARATUS FOR USE IN A DATA COMMUNICATIONS NETWORK SERVING SUBSCRIBERS OPERATING AT A PLURALITY OF TRANSMISSON DATA RATES

[75] Inventor: Kadathur Subramanya Natarajan, Schaumburg, Ill.

[73] Assignee: Motorola, Inc., Schaumburg, Ill.

[21] Appl. No.: 597,630

[22] Filed: Feb. 6, 1996

[51] Int. Cl.[6] .................................................. H04J 3/22
[52] U.S. Cl. ........................... 370/472; 370/476; 370/545
[58] Field of Search ................................. 370/465, 468, 370/470, 471, 472, 473, 474, 476, 545, 328; 375/58, 59

[56] References Cited

U.S. PATENT DOCUMENTS

| | | | |
|---|---|---|---|
| 5,051,988 | 9/1991 | Kawahigashi et al. | 370/476 |
| 5,119,403 | 6/1992 | Krishnan | 370/476 |
| 5,434,859 | 7/1995 | Levardon | 370/468 |
| 5,544,164 | 8/1996 | Baran | 370/352 |
| 5,550,820 | 8/1996 | Baran | 370/474 |
| 5,568,482 | 10/1996 | Li et al. | 370/473 |

*Primary Examiner*—Douglas W. Olms
*Assistant Examiner*—Ricky Q. Ngo
*Attorney, Agent, or Firm*—Darleen J. Stockley

[57] ABSTRACT

A data communication system that includes a subscriber unit operating at a transmission data rate encompasses a method of transmitting an information stream. This method includes the steps of determining the transmission data rate, determining a partitioning factor based at least in part on the transmission data rate, gathering constituent elements of the information stream, and using the partitioning factor to packetize the constituent elements of the information stream for transmission thereof.

21 Claims, 2 Drawing Sheets

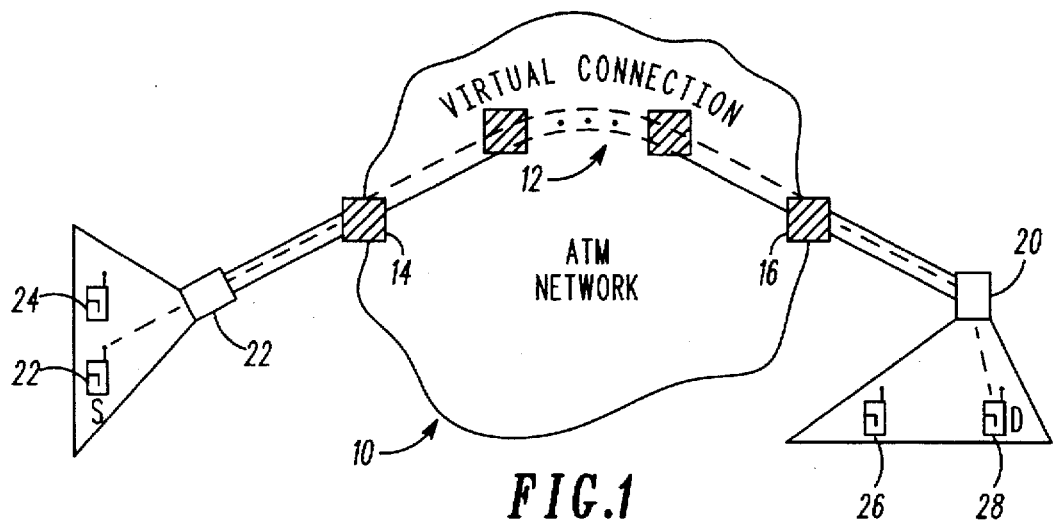
FIG.1
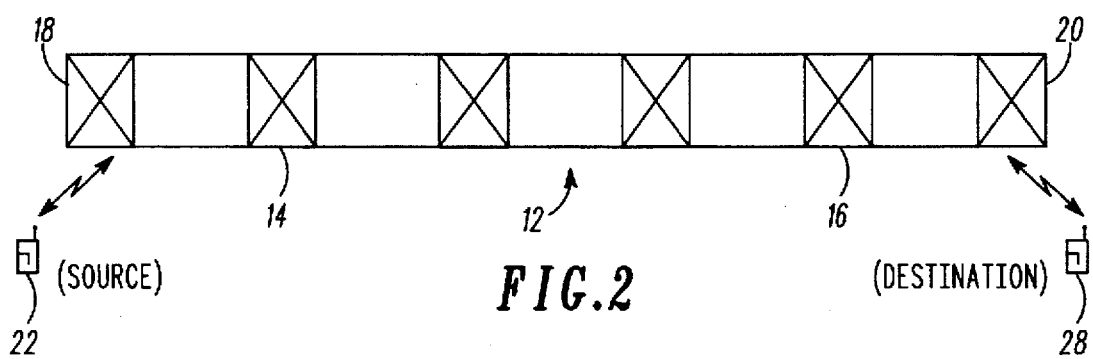
FIG.2
FIG.3A
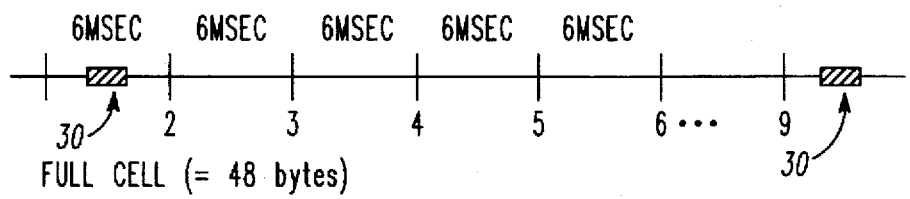
FIG.3B
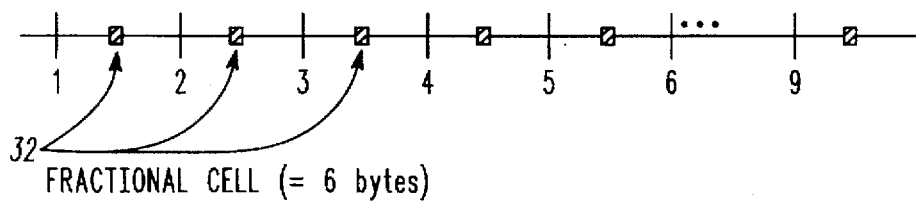

METHOD AND APPARATUS FOR USE IN A DATA COMMUNICATIONS NETWORK SERVING SUBSCRIBERS OPERATING AT A PLURALITY OF TRANSMISSON DATA RATES

FIELD OF THE INVENTION

This invention is directed generally to the field of multiple subscriber communications networks, and more particularly to a novel method which permits a heterogeneous group of subscribers requiring services at various data rates to more efficiently utilize a high speed communications network without experiencing the expected performance limitations caused by delay.

BACKGROUND OF THE INVENTION

Multimedia communication (voice, video and data) between two stations may utilize a high speed wired communications network (i.e., a backbone network), which may be based on optical fiber or coaxial cable. The respective users (subscribers) communicate over the communications network by using connection-oriented services provided by integrated services digital networks (ISDN). These networks may be based on asynchronous transfer mode (ATM) cell-relay switching and multiplexing technology. In practice, a plurality of subscribers may be coupled by wireless communications resources to a base station. The base station may be in turn coupled through an ATM switch to the high speed communications network. A plurality of such base stations may be coupled to a corresponding plurality of ATM switches to service a plurality of groups of subscribers.

In ATM, information is handled in the form of digital data in "ATM cells", each cell carrying a fixed number of bits or a "packet" of data. Depending upon the encoding rates of the source, some amount of "packetizing delay" occurs in the process of generating the ATM cells. Other delays experienced in an ATM system include propagation delay, transmission delay, switching delay(s), queuing delay(s) and depacketization delay, which together make up the end-to-end delay of the system.

ATM networks provide a type of communication in which an assigned path is created between a sender and a receiver before the communication begins. The switching and multiplexing technology for accomplishing this has been designed on the assumption that the transmitter/receiver of each subscriber or user can operate at a sufficiently high speed that the delay in ATM cell generation is not the primary contributor to the application level end-to-end delay performance from the transmitter to the receiver.

While the foregoing may be true of high speed applications such as transmission of digital data from one user to another, the requirements for other uses such as voice communication or video are somewhat different. For example, for low speed voice and video transmissions, the loss of a single cell of data usually has negligible effect on the quality of the overall transmission; however, the quality of service for voice or video transmission will be unacceptable if overly long delays are experienced between successive cells of voice or video information due to packetization delay. In contrast, in digital data transmissions, delays between packets of information can be tolerated, so long as any loss of information is minimized. On the other hand, video transmission is less sensitive to cell loss and delay, but is more sensitive to delay variation. Thus, factors such as packetization delay and packet size can affect the quality of service.

Moreover, such voice and video sources or subscribers are, as mentioned above, coupled by wireless communications resources to the ATM network. Therefore, typical voice and video subscribers are usually limited by the available wireless bandwidth to relatively low transmission bit rates. That is, a great many users must fit into available wireless bandwidth, such that the bandwidth requirement of each user should ideally be minimized. Accordingly, these low bit rate subscribers will require more time to assemble packets of information of a given number of bytes for transmission over the ATM network.

The ATM cell design standard currently calls for 53 byte packets, of which 48 bytes comprise the information or data to be transmitted. While this cell size is compatible with data transmission at relatively high speeds, when applied to low bit rate services, the packetization delay results in a much lower quality of service. Thus, it is desirable to enable low speed subscribers or users to have access to the high speed backbone network while minimizing the compromise of the quality of service due to packetization delay which is experienced by these low speed users.

Accordingly, it is desirable to offer a flexible strategy such that users having diverse transmission rate requirements can share the wireless communications resources and the high speed communications network while minimizing any compromises to the quality of service for the individual users. A related consideration is to permit users having different transmission rate requirements to utilize different packetization schemes in order to optimize quality of service for each user in spite of the differences in data transmission rates among the various users.

BRIEF DESCRIPTION OF THE DRAWINGS

FIG. 1 illustrates an ATM communications network to which various subscribers are interfaced via wireless communications resources;

FIG. 2 shows respective source and destination subscribers coupled with an ATM network through respective base stations, with the ATM network being illustrated as a series of switches;

FIG. 3 shows a comparison between two methods of ATM cell generation, FIG. 3A using full ATM cells, as in known in the art, and FIG. 3B using fractional cells, in accordance with the invention;

DETAILED DESCRIPTION OF A PREFERRED EMBODIMENT

Figure 4:
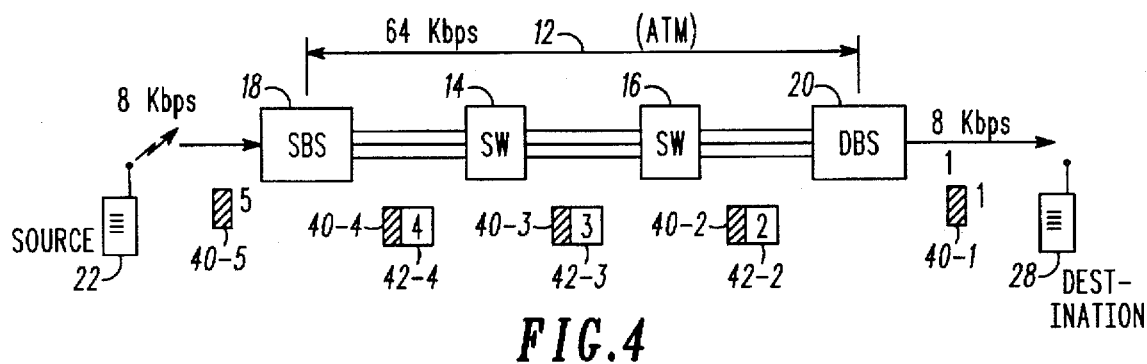
FIG. 4 is an illustration showing generation of information cells and transmission of the cells through an ATM network, in accordance with one aspect of the invention.

Referring now to the data communication system shown in FIG. 1, the present invention facilitates the use of a high speed communication network, such as an ATM network 10, by multiple users having different transmission data rate requirements. The ATM network 10 contains a set of virtual connections, i.e., an end-to-end communication path connecting an ATM switch 14 to another ATM switch 16 and may contain intermediate ATM switches, as shown in FIG. 1. In a preferred embodiment, neighboring (i.e., adjacent) switches are directly connected by a fiber optic link, coaxial cable or other wired medium. Additionally, the ATM switches 14, 16 are themselves coupled by wired medium to respective base stations 18, 20. More of such base stations may be accommodated by the ATM network 10, only two such base stations being here shown for ease of illustration.

Each base station 18, 20 is capable of facilitating communication among a plurality of subscriber units 22, 24 and 26, 28. Each base station may accommodate more subscriber units, two such subscriber units being here shown for each base station for ease of illustration. Each of the subscriber units 22, 24, 26, 28 communicates with its associated base station by wireless communications resources, that is, there is not a wired or cable link between each subscriber unit and its associated base station, but rather wireless or "over the air" communications are used.

At this juncture, it will be appreciated that the bandwidth and thus communications carrying capability of the fiber optic or coaxial cables of the ATM network 10 are usually in excess of the bandwidth capabilities of most wireless communications resources. That is, wireless communications resources are generally required to occupy only a limited bandwidth of the frequency spectrum, such that the data transmission rate of such wireless communications resources is limited by these bandwidth limitations. Thus, for example, typical voice or video transmissions are generally limited to 8 kbps or 16 kbps or 32 kbps transmission rates. Accordingly, associated subscriber units such as subscriber units 22, 24, 26 and 28 are constrained to operate at these rates.

Referring also to FIG. 2, for purposes of illustrating a typical connection over the ATM network between two subscriber units, subscriber unit 22 has been designated as a "source" with respect to a given transmission of information, while the subscriber unit 28 has been designated as "destination" with respect to this same information stream. Thus, the base station 18 is designated as the source base station with respect to this particular information transmission, while the base station 20 is designated as the destination base station.

The ATM network between these two base stations 18 and 20 may utilize a number of ATM switches, including switches 14 and 16 as shown in FIG. 2, at opposite ends of the ATM network, as well as some number of intermediate ATM switches therebetween. It is these switches that will generate what is referred to as the switching delay of a given information transmission, as referred to briefly hereinabove.

However, and referring to FIG. 3A, the most significant delay in the case of a relatively low rate of transmission by a subscriber unit (e.g., subscriber 22) will occur in the packetization delay, that is, the time required to assemble packets of information of a predetermined number of bytes for transmission over the ATM network 10. In this regard, one ATM standard calls for a "full" ATM cell of 53 byte packets, of which 48 bytes comprise the information with the remaining bytes comprising various system control and signaling capacity. In this context, each byte of information is understood to comprise 8 bits of information, thus, the 48 byte packet comprising the information carried in one ATM cell contains 384 bits of information.

Assuming that the source subscriber unit 22 operates at an 8 kbps transmission rate, it will require 48 msec to assemble one full ATM cell 30 having 48 bytes of information, that is, 384/8. Thus, FIG. 3(a) illustrates the operation of the source 22 operating at 8 kbps transmission rate, resulting in one full cell being assembled in every 48 msec. However, the frame time of the ATM system shown in FIG. 3 is 6 msec. Thus, a full cell of information is generated only once every 8 frames when using the "full cell" packet size of 48 bytes of information. This is due to the packetizing delay, that is, the length of time (48 msec) required to assemble a 48 byte (384 bit) packet at a transmission rate of 8 kbps. Such long packetizing delays between packets of information can lead to unacceptable degradation of the quality of transmission, particularly in the transmission of voice information and video information.

Referring to FIG. 3B, the present invention proposes to "partition", that is, utilize "fractional" ATM cells in order to overcome this delay problem. In accordance with the present invention, the ATM cell size of 48 bytes is divided by a "partitioning factor", which in the illustrated embodiment comprises a power of two corresponding to the ratio between the maximum transmission rate (e.g., 64 kbps) and the transmission rate of the source subscriber unit that is connected by wireless communication resources to a given base station. In the example given above, the subscriber source operates at 8 kbps, such that this partitioning factor is 8 (64/8). Accordingly, using a partitioning factor of 8, the base station then assembles what is termed a subcell or fractional cell 32 containing 48/8 or 6 bytes each. This is illustrated in FIG. 3(b), wherein each frame contains a fractional cell 32 containing 6 bytes of information received from the subscriber source 22 at the 8 kbps rate. That is, a fractional cell 32 having 6 bytes of information can be packetized in each and every 6 msec frame using the method of the invention, avoiding the packetizing delay and consequent multiple frame delays as shown in FIG. 3(a).

Thus, in a method in accordance with the invention, a source base station, such as base station 18, first determines the transmission data rate of a subscriber unit, then determines a partitioning factor based on that transmission data rate. The method proceeds by gathering the constituent elements or bytes of the information stream from the subscriber unit and using the partitioning factor to packetize these constituent elements or bytes of the information stream for transmission over the ATM network 10. In the embodiment illustrated in FIG. 3(b), the partitioning factor is 8, and the constituent elements or bytes of the information stream are packetized into 6 byte packets, which thus comprise one-eighth cells, a full cell having been defined as 48 bytes of information.

When the source transmits at other data rates, other partitioning factors will be used resulting in fractional cells containing different numbers of bytes of data. That is, each transmission data rate is assigned a partitioning factor such that one packet of information of a size corresponding to the maximum cell size (48 bytes) divided by a power of two will be placed in each frame of the transmission. Thus, for example, for a 32 kbps source, a "half" cell of 24 bytes (64/32=2; 48/2=24) will be transmitted in each frame, and for a 16 kbps source, a "quarter" cell of 12 bytes (64/16=4; 48/4=12) will be transmitted in each frame. Therefore, in each case a packet of information will be transmitted in each frame, without delays of one or more frames in between as in FIG. 3(a). Thus, in the example of FIG. 3(b), each full ATM cell 30 (48 bytes of information) is partitioned into a sequence of 8 fractional cells 32 that are transmitted in a sequence of 8 consecutive frames (i.e., a continuous series of cells). This avoids multiple frame delays between packets of information as was the case in FIG. 3(a) in which only full cells of 48 bytes of information were used to packetize information.

Referring next to FIG. 4, upon receipt of the number of bytes to make up a fractional cell 40 of the size which it has determined by use of a partitioning factor, the source base station 18 encapsulates one such fractional cell or minicell 40 into a full ATM cell 42 within each frame, and transmits this encapsulated cell along the ATM virtual connection 12 to the destination base station 20. The source base station 18 may further assign, and transmit to the destination base station a sequence number for each subcell being encapsulated in a full ATM cell. Thus, sequence numbers 1 through 5 are shown reading from right to left in FIG. 6, i.e., the order in which the cells are encapsulated and transmitted to the destination 28. These sequence numbers also are used as hyphenated suffixes to identify fractional cells 40-1, 40-2, etc. and full ATM cells 42-1, 42-2, etc. in FIG. 4. Upon receipt of the fractional cell or subcell encapsulated in the full ATM cell, the destination base station 20 extracts the fractional cell or subcell and transmits at to the destination subscriber unit 28. It should be noted that ATM networks are typically capable of supporting a number of virtual connections operating at a variety of speeds. The encapsulation scheme described here assumes a minimum 64 kbps ATM virtual connection. However, in practice, the speed of the virtual connection used in the ATM network could be 64 kbps or higher.

Figure 5:
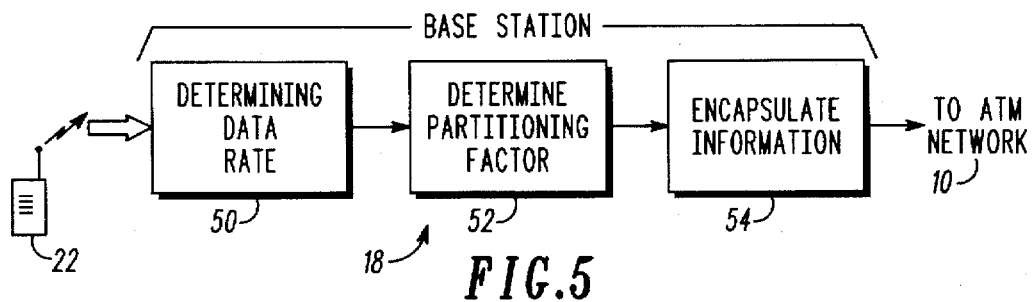
FIG. 5 shows a block diagram illustrating a number of components of a base station, in accordance with the invention.

Thus, referring to FIG. 5, a base station 18 includes rate determining means 50 for determining the transmission data rate of a subscriber unit such as subscriber unit 22. The transmission data rate may be determined in several different ways. In one embodiment, it may be determined by the identity of a subscriber unit, which is transmitted through a control information channel to the base station, with the base station recognizing the transmission data rate to be used by that subscriber from its' identity information. Alternatively, the transmission data rate of the subscriber unit may be directly communicated to the base station via the control information channel. In yet another alternative, the base station may set a transmission data rate (in the case of a subscriber unit that is capable of utilizing two or more data transmission rates) based upon other demands on the system at any given time. The base station transmits the selected data transmission rate to the subscriber unit, and the subscriber unit thereafter uses this data transmission rate selected by the base station.

The base station 18 further includes factor determining means 52 for determining a partitioning factor, which is based at least in part on this transmission data rate. As shown in FIG. 4, the base station also includes encapsulating means 54 that encapsulate each fractional cell into a full ATM cell for transmission thereof over the ATM network 10. The rate determining means 50, factor determining means 52 and encapsulating means 54 may be embodied in a processor chip or element, or implemented by software.

Figure 6:
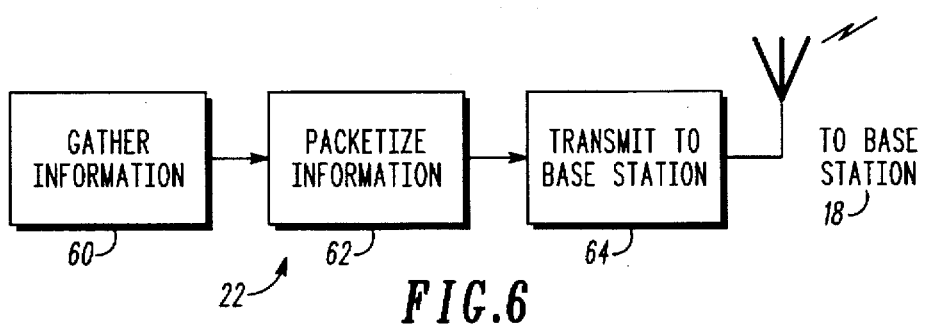
FIG. 6 shows a block diagram illustrating components of a subscriber unit, in accordance with the invention.

Referring next to FIG. 6, a subscriber unit 22, in accordance with the invention, includes means 60 for gathering constituent elements of the information stream. Further, packetizing means 62, which uses the partitioning factor to packetize the constituent elements of the information stream for transmission thereof, is included in the subscriber unit. The subscriber unit 22 also includes transmission means 64 for transmitting the packetized information to a base station. As with the base station, the information gathering means 60, and the packetizing means 62, may be embodied in a processor chip or element, or implemented by software, while the transmitting means may be a wireless transmitter of a known type.

Figure 7:
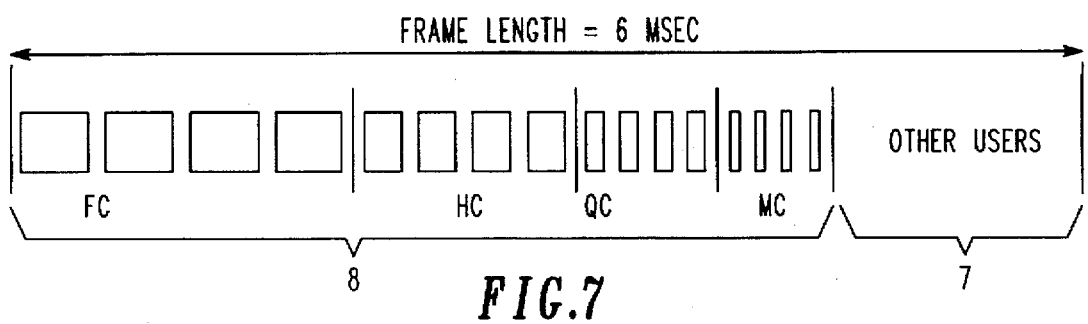
FIG. 7 shows an overall frame structure which may be implemented for wireless communication, in accordance with the invention.

Referring now to FIG. 7, each wireless frame may accommodate a number of users with different transmission data rate requirements. In the example illustrated in FIG. 6, a 1 Mbps transmission speed of the wireless link is assumed. This is equivalent to 1,000 bits per msec, and therefore the illustrated 6 msec frame length accommodates 6,000 bits of information. Dividing by the number of bits in a full cell (48 bytes×8=384 bits) gives a capacity of approximately 15 full cells in the frame of 6 msec. Thus, this frame might accommodate a number of full cells, each containing 48 bytes of information, a number of half cells, each containing 24 bytes, a number of quarter cells containing 12 bytes each, and a number of minicells, or subcells, having 6 bytes of information each. The number of full (4), half (5), quarter (4) and mini (4) cells illustrated in FIG. 7 sum to a total of eight full cells of information (8×48 bytes), thus leaving an additional seven full cells of information space in the 6 msec frame for other users.

The respective full cells, half cells, and other fractional cells illustrated in FIG. 7 all come from different subscriber units that are utilizing different partitioning factors to packetize information either into full cells (factor of 1) or variously sized fractional cells. Thus, with the packetizing options provided by the invention, a maximum number of users may be accommodated within the frame, thereby efficiently using the available wireless bandwidth.

The respective cell sizes and their corresponding transmission data rates of the source subscriber unit in each case is indicated in the following table.

TABLE I

|  | Transmission data rate: |
| --- | --- |
| FC = Full Cell = 48 Bytes | 64 kbps |
| HC = Half Cell = 24 Bytes | 32 kbps |
| QC = Quarter Cell = 12 Bytes | 16 kbps |
| MC = Mini (Sub) Cell = 6 Bytes | 8 kbps |

Thus, the present invention makes possible efficient use of the wireless bandwidth, and permits multiple users having different transmission data rates to share the bandwidth in each frame. This is accomplished in a way that avoids delays of one frame or more between packets of information from any one subscriber.

What is claimed is:

1. In a data communication system including a first subscriber unit that operates at a first transmission data rate, a method of transmitting an information stream comprising the steps of:

determining the first transmission data rate;

determining a partitioning factor based at least in part on the first transmission data rate;

gathering constituent elements of the information stream; and using the partitioning factor to packetize the constituent elements of the information stream for transmission thereof.

2. The method according to claim 1 wherein said first subscriber unit is capable of using one of a plurality of different transmission rates, and wherein a second transmission data rate to be used is transmitted to said first subscriber unit by a base station, and further including the step of using the second transmission data rate.

3. The method according to claim 1 wherein the step of using the partitioning factor includes using a partitioning factor that is a power of two to packetize the constituent elements of the information stream into a continuous series of cells, wherein each cell contains a substantially similar number of bytes of information.

4. The method according to claim 1 wherein the step of using the partitioning factor further includes dividing a maximum number of bytes per cell by the partitioning factor to determine a number of bytes of information to be contained in each cell.

5. The method according to claim 1 wherein the step of determining a partitioning factor further comprises the step of dividing a maximum transmission data rate by the first transmission data rate used by the first subscriber unit.

6. The method according to claim 1 wherein said data communication system further includes an asynchronous transfer mode (ATM) network that operates at a second transmission data rate higher than the first transmission data rate and defines a full cell capable of carrying 48 bytes of information, wherein the step of using further comprises packetizing the constituent elements of the information stream into fractional cells, each comprising a packet of information having a number of bytes equal to 48 divided by the partitioning factor, and further including the step of encapsulating at least one of said fractional cells within a full cell, to thereby form an encapsulated fractional cell.

7. The method according to claim 6 wherein said data communication system includes a second subscriber unit and a destination base station associated with said second subscriber unit, and further including the steps of assigning a sequence number to the encapsulated fractional cell and transmitting said sequence number to a destination base station.

8. The method according to claim 6 wherein said data communication system further includes a second subscriber unit, said method further including the step of extracting said encapsulated fractional cell from a corresponding full cell to produce an extracted fractional cell, and transmitting the extracted fractional cell to said second subscriber unit.

9. The method according to claim 6 wherein the step of using the partitioning factor includes using a partitioning factor that is a power of two.

10. The method according to claim 6 wherein the step of determining a partitioning factor further comprises the step of dividing the second transmission data rate by the first transmission data rate used by the first subscriber unit.

11. In a data communication system that includes a base station for facilitating communications among a plurality of subscriber units having varying data rate requirements, a method of transmitting an information stream, comprising the steps of:

at the base station,
determining a first transmission data rate for a first of the plurality of subscriber units;
determining a partitioning factor based at least in part on the first transmission data rate;
at the first subscriber unit,
gathering constituent elements of the information stream; and
using the partitioning factor to packetize the constituent elements for transmission thereof.

12. The method according to claim 11 wherein the first subscriber unit is capable of using one of a plurality of different transmission data rates and further including the steps of:

at the base station,
transmitting, to the first subscriber unit, the first transmission data rate to be used; and
at the first subscriber unit,
using the first transmission data rate to transmit the information stream.

13. The method according to claim 11 wherein the step of using the partitioning factor includes using a partitioning factor that is a power of two to packetize the constituent elements of the information stream into a continuous series of cells, wherein each of the continuous series of cells contains a like number of bytes of information.

14. The method according to claim 11 wherein the step of using the partitioning factor further includes dividing a maximum number of bytes per cell by the partitioning factor to determine a number of bytes of information to be contained in each cell.

15. The method according to claim 11 wherein the step of determining a partitioning factor further comprises the step of dividing a maximum transmission data rate by the transmission data rate determined for first subscriber unit.

16. A base station for interfacing between a high speed communications network and a source subscriber unit operating at a transmission data rate for transmitting packets of information, the network carrying information in full cells of a predetermined number of bytes of information, the base station comprising:

means for determining the transmission data rate;
means for determining a partitioning factor based at least in part on the transmission data rate; and
means for encapsulating the packets of information into full cells for transmission thereof.

17. The base station according to claim 16 and further including means for extracting said packets of information from full cells for transmission to a destination subscriber unit.

18. A subscriber unit that operates at a transmission data rate for transmitting an information stream, comprising:

means for gathering constituent elements of the information stream;
means for identifying a partitioning factor that is based, at least in part on the transmission data rate;
means for packetizing the constituent elements of the information stream using the partitioning factor to produce packetized information; and
means for transmitting the packetized information.

19. The subscriber unit according to claim 18 wherein said packetizing means uses the partitioning factor that is a power of two to packetize the elements of the information stream into a continuous series of cells, wherein each cell contains a like number of bytes of information.

20. The subscriber unit according to claim 18 wherein said packetizing means further divides a maximum number of bytes per cell by the partitioning factor to determine a number of bytes of information to be contained in each cell.

21. The data communication subscriber unit according to claim 18 wherein the means for determining a partitioning factor divides a maximum transmission rate by the transmission data rate.

* * * * *